United States Patent

Katoh et al.

[11] Patent Number: 5,789,834
[45] Date of Patent: Aug. 4, 1998

[54] SPINDLE MOTOR

[75] Inventors: Yoshihisa Katoh; Fujio Nakagawa; Yasuo Sasaki, all of Yonago, Japan

[73] Assignee: Matsushita Electric Industrial Co., Ltd., Osaka, Japan

[21] Appl. No.: 646,221

[22] Filed: May 6, 1996

[30] Foreign Application Priority Data

May 8, 1995 [JP] Japan ................. 7-109247

[51] Int. Cl.$^6$ ................. H02K 1/06; H02K 3/46
[52] U.S. Cl. ................. 310/67 R; 310/268; 310/42; 310/91; 310/DIG. 6; 310/254
[58] Field of Search ................. 310/268, 68 R, 310/67 R, 42, 91, 216, 43; 360/99.04, 99.08, 99.09

[56] References Cited

U.S. PATENT DOCUMENTS

| | | | |
|---|---|---|---|
| 4,517,480 | 5/1985 | Mueller | 310/68 R |
| 4,626,727 | 12/1986 | Janson | 310/268 |
| 4,788,464 | 11/1988 | Nishikawa et al. | 310/268 |
| 4,812,937 | 3/1989 | Nemoto et al. | 360/133 |
| 4,841,393 | 6/1989 | MacLeod et al. | 310/68 R |
| 4,883,982 | 11/1989 | Forbes | 310/62 |
| 5,170,086 | 12/1992 | Wrobel | 310/217 |
| 5,173,628 | 12/1992 | Yoshida et al. | 310/71 |
| 5,252,871 | 10/1993 | Inoue | 310/90 |
| 5,254,895 | 10/1993 | Koizumi | 310/156 |
| 5,304,879 | 4/1994 | Suzuki et al. | 310/67 R |
| 5,319,270 | 6/1994 | Tanaka et al. | 310/67 R |
| 5,357,160 | 10/1994 | Kaneda et al. | 310/68 R |
| 5,436,517 | 7/1995 | Ogawa | 310/91 |
| 5,461,271 | 10/1995 | Asama et al. | 310/91 |
| 5,578,883 | 11/1996 | Sakashita et al. | 310/91 |
| 5,604,389 | 2/1997 | Nitta et al. | 310/61 R |

*Primary Examiner*—Thomas M. Dougherty
*Assistant Examiner*—B. Mullins
*Attorney, Agent, or Firm*—Pollock, Vande Sande & Priddy

[57] ABSTRACT

A spindle motor includes a printed wiring board. A stator is fixed to the printed wiring board. A housing is fixed to the printed wiring board. A bearing is provided on the housing. A rotor shaft is rotatably supported by the bearing. A hub base is mounted on the rotor shaft. A stator winding provided on the stator is bonded to the printed wiring board. The stator may have an inner circumferential portion formed with a plurality of grooves. In this case, it is preferable that the printed wiring board has a plurality of through holes at positions corresponding to positions of the grooves in the stator.

3 Claims, 2 Drawing Sheets

SPINDLE MOTOR

BACKGROUND OF THE INVENTION

1. Field of the Invention

This invention relates to a spindle motor for a device such as a floppy disc drive.

2. Description of the Prior Art

Floppy disc drives have spindle motors for rotating floppy discs. Some floppy disc drives have a thin configuration.

In a spindle motor of a typical floppy disc drive of a thin configuration, stator windings are provided on respective radially-extending stator portions which oppose an annular rotor frame. Normally, the stator portions are spaced from the rotor frame by a given gap. When a stator portion is deformed toward the rotor frame, a related stator winding tends to contact the rotor frame and interfere with rotation of the rotor frame. Accordingly, it is important to prevent such deformation of the stator portions.

SUMMARY OF THE INVENTION

It is an object of this invention to provide an improved spindle motor.

A first aspect of this invention provides a spindle motor comprising a printed wiring board; a stator fixed to the printed wiring board; a housing fixed to the printed wiring board; a bearing provided on the housing; a rotor shaft rotatably supported by the bearing; a hub base mounted on the rotor shaft; and a stator winding provided on the stator and bonded to the printed wiring board.

A second aspect of this invention is based on the first aspect thereof, and provides a spindle motor wherein the stator has an inner circumferential portion formed with a plurality of grooves, and the printed wiring board has a plurality of through holes at positions corresponding to positions of the grooves in the stator.

A third aspect of this invention provides a spindle motor comprising a printed wiring board; a stator; and a stator winding provided on the stator and bonded to the printed wiring board.

A fourth aspect of this invention provides a spindle motor comprising a printed wiring board; a stator fixed to the printed wiring board; a housing wall fixed to the printed wiring board; a bearing provided on the housing wall; a rotor shaft rotatably supported by the bearing; a hub base mounted on the rotor shaft; a rotor frame fixed to the hub base; a stator winding provided on the stator and bonded to the printed wiring board, the stator winding opposing a part of the rotor frame and spaced therefrom by a gap; and a drive pin movably supported on the rotor frame; wherein the stator is separate from the housing wall by a space which allows movement of the drive pin.

DESCRIPTION OF THE PREFERRED EMBODIMENT

Figure 1:
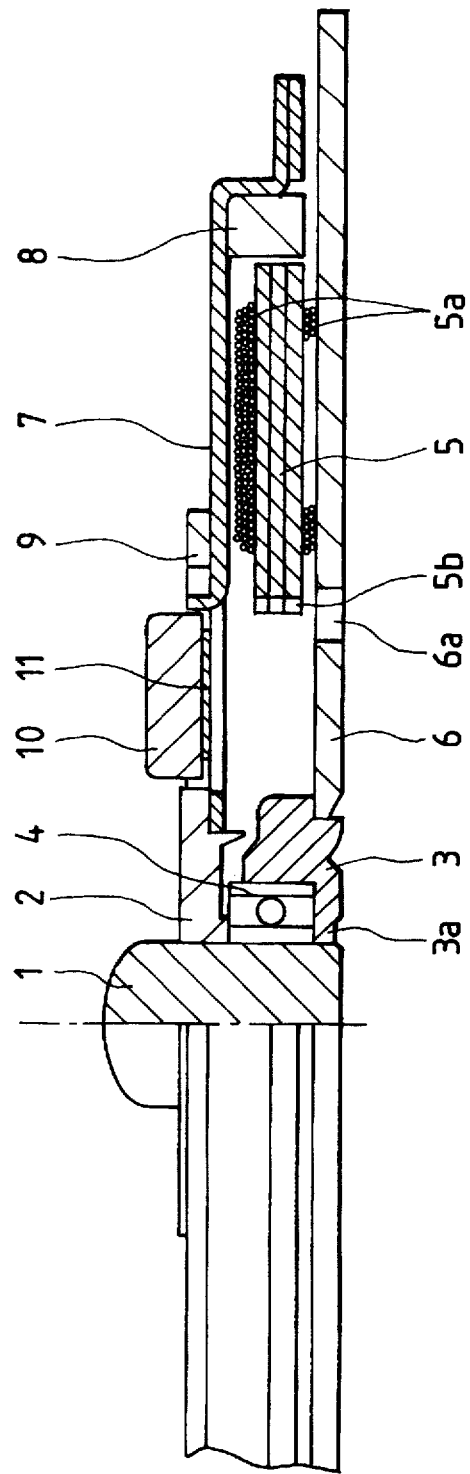
FIG. 1 is a sectional view of a spindle motor according to an embodiment of this invention.
Figure 2:
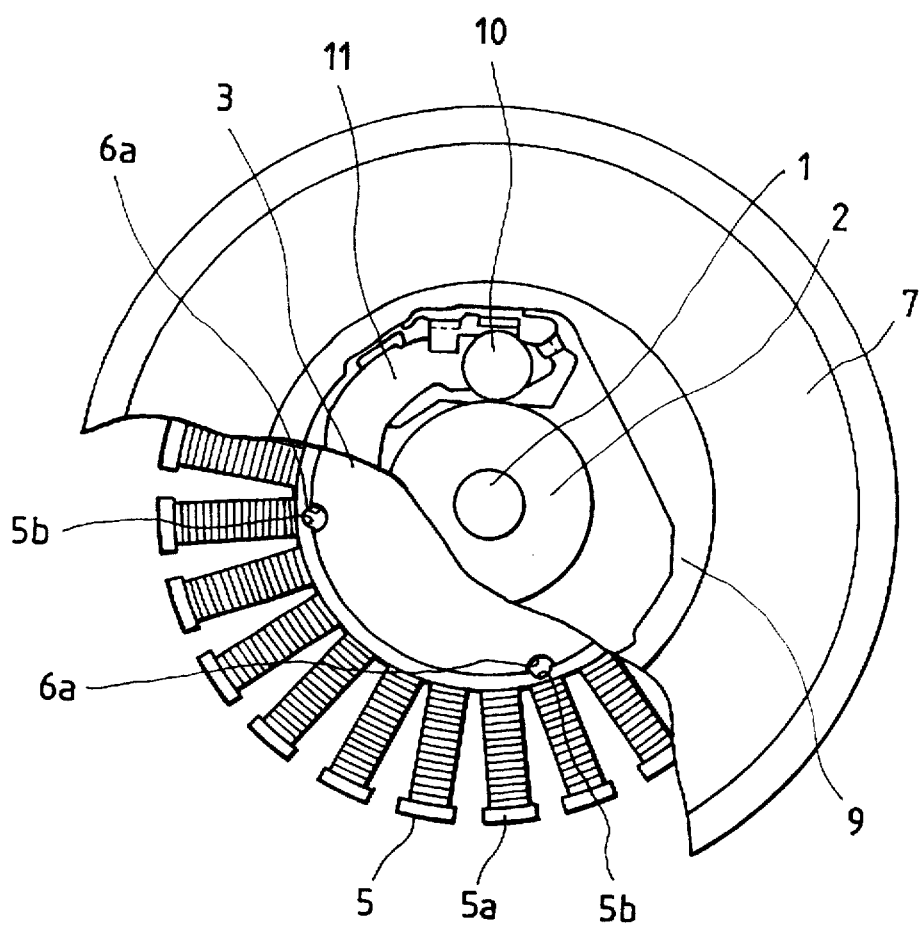
FIG. 2 is a plan view, with portions broken away, of the spindle motor in FIG. 1.

With reference to FIGS. 1 and 2, a spindle motor in a floppy disc drive includes a cylindrical rotor shaft 1 fixed to a hub base 2. The hub base 2 coaxially extends around the rotor shaft 1. The rotor shaft 1 is rotatably supported by a bearing 4 and a bearing portion 3a of a housing 3. The rotor shaft 1 is circumferentially rotatable relative to the housing 3. The bearing 4 coaxially extends around the rotor shaft 1. The bearing 4 is supported by the housing 3. The bearing portion 3a of the housing 3 coaxially extends around the rotor shaft 1. The housing 3 is fixed to a printed wiring board 6 by a suitable process such as a pressing and deforming process or an adhesive-based bonding process. It is preferable that the printed wiring board 6 has an adequate degree of flatness.

A stator 5 has a ring base and radially-extending portions. The ring base of the stator 5 is an inner circumferential portion thereof. The ring base of the stator 5 extends coaxially with and outward of the rotor shaft 1. The radially-extending portions of the stator 5 project from the ring base thereof. The radially-extending portions of the stator 5 are spaced by equal angular intervals along a circumferential direction with respect to the rotor shaft 1. Stator windings 5a are provided on the radially-extending portions of the stator 5 respectively. The stator windings 5a are fixed and bonded to the printed wiring board 6 by, for example, adhesive.

An annular rotor frame 7 is fixed to the hub base 2. The rotor frame 7 extends coaxially with and outward of the rotor shaft 1. The stator 5 opposes an outer part of the rotor frame 7. The stator windings 5a are axially spaced from the rotor frame 7 by a given gap or clearance. The rotor frame 7 retains a ring magnet 8 which extends radially outward of the stator 5. The ring magnet 8 magnetically or electromagnetically operates on the stator windings 5a.

A magnet 9 supported on the rotor frame 7 serves to attract a floppy disc (not shown). The floppy disc is attracted by the magnet 9, being fixedly placed on the hub base 2. A drive pin 10 is mounted on a leaf spring 11 supported by the rotor frame 7. Thus, the drive pin 10 is supported on the rotor frame 7. The drive pin 10 can move along an axial direction with respect to the rotor shaft 1. In other words, the drive pin 10 can move upward and downward relative to the rotor frame 7. The drive pin 10 serves to chuck the floppy disc when being moved downward and being urged by the leaf spring 11. The ring base of the stator 5 has grooves 5b. The grooves 5b in the ring base of the stator 5 have a semicircular cross-section or a triangular cross-section. The printed wiring board 6 has through holes 6a at positions corresponding to the positions of the grooves 5b in the ring base of the stator 5 respectively. The through holes 6a of the printed wiring board 6 substantially align with the grooves 5b in the ring base of the stator 5 along axial directions respectively.

During assembly of the spindle motor, the stator windings 5a and the printed wiring board 6 are pressed against each other and are bonded together by, for example, adhesive while the grooves 5b in the ring base of the stator 5 and the through holes 6a in the printed wiring board 6 are held in alignment with each other by using pins (not shown) engaging the grooves 5b and the through holes 6a. As a result, the stator 5 is attached to the printed wiring board 6.

Even in the case where the stator 5 in an original state has a deformation, the deformation of the stator 5 can be corrected or removed by bonding the stator windings 5a to the adequately-flat printed wiring board 6. Accordingly, it is possible to stably maintain the gap between the rotor frame 7 and the stator windings 5a.

The innermost part of the stator 5, that is, the ring base of the stator 5 is axially separate from the housing 3 by a space which allows downward movement of the drive pin 10. Thus, the stator 5 and the housing 3 do not interfere with downward movement of the drive pin 10. This is advantageous in thinning the spindle motor.

What is claimed is:

1. A spindle motor comprising:

a printed wiring board;

a stator, the stator having an inner circumferential portion formed with a plurality of grooves having positions corresponding to a plurality of through holes in the printed wiring board for aligning said stator with said printed wiring board;

a housing wall fixed to the printed wiring board;

a bearing provided on the housing wall;

a rotor shaft rotatably supported on the housing wall by the bearing;

a hub based mounted on the rotor shaft;

a rotor frame fixed to the hub base;

a stator winding provided on the stator and directly bonded to the printed wiring board so that the stator is fixed to the printed wiring board via the stator winding, the stator winding opposing a part of the rotor frame and spaced therefrom by a gap to allow relative rotation between the rotor frame and the stator winding; and a drive pin movably supported on the rotor frame;

wherein the stator is separate from the housing wall by a space in a radial direction with respect to the rotor shaft, and the drive pin is movable into and from the space along a direction parallel to an axis of the rotor shaft.

2. A spindle motor comprising:

a housing supporting a bearing;

a rotor shaft supported for rotation by said bearing, said shaft including at one end thereof a hub base;

a rotor frame connected to said hub base, said rotor frame including a drive pin flexibly supported to said rotor frame along an axis which is parallel to said rotor shaft to permit said drive pin to be deflected below said rotor frame, said rotor frame including at a periphery thereof a magnet extending under said rotor frame; and a printed circuit board connected to said housing below said rotor frame in a plane perpendicular to said rotor shaft, said printed circuit board including a stator winding wound on a stator, and bonded to said printed circuit board, said stator having an inner circumferential portion formed with a plurality of grooves which correspond to a plurality of alignment through holes on said printed circuit board, said stator winding having one end spaced from said bearing to provide a clearance between said circuit board and said drive pin for said drive pin to move into, and an opposite end adjacent said magnet.

3. The spindle motor according to claim 2 further comprising a second magnet supported on said frame for positioning a disc on said hub.

* * * * *